(12) United States Patent
Kang et al.

(10) Patent No.: US 12,223,956 B2
(45) Date of Patent: Feb. 11, 2025

(54) DISPLAY DEVICE AND METHOD FOR CONTROLLING SAME

(71) Applicant: SAMSUNG ELECTRONICS CO., LTD., Suwon-si (KR)

(72) Inventors: Donghoon Kang, Suwon-si (KR); Soohyang Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 17/740,616

(22) Filed: May 10, 2022

(65) Prior Publication Data

US 2022/0270608 A1 Aug. 25, 2022

Related U.S. Application Data

(63) Continuation of application No. PCT/KR2020/018679, filed on Dec. 18, 2020.

(30) Foreign Application Priority Data

Jan. 21, 2020 (KR) .................. 10-2020-0007759

(51) Int. Cl.
*G10L 15/22* (2006.01)
*G06F 3/14* (2006.01)
(Continued)

(52) U.S. Cl.
CPC ............... *G10L 15/22* (2013.01); *G06F 3/14* (2013.01); *G06F 3/167* (2013.01); *G10L 15/08* (2013.01);
(Continued)

(58) Field of Classification Search
None
See application file for complete search history.

(56) References Cited

U.S. PATENT DOCUMENTS

2015/0012279 A1  1/2015  Kim et al.
2019/0066672 A1  2/2019  Wood et al.
(Continued)

FOREIGN PATENT DOCUMENTS

CN  107919123 A    4/2018
EP  3 567 584 A1   11/2019
(Continued)

OTHER PUBLICATIONS

International Search Report issued in International Patent Application No. PCT/KR2020/018679 dated Apr. 9, 2021.
(Continued)

*Primary Examiner* — Antim G Shah
(74) *Attorney, Agent, or Firm* — STAAS & HALSEY LLP

(57) ABSTRACT

A display device including a user input receiver configured to receive a user input; a voice receiver configured to receive a user voice input; a memory configured to store a plurality of Voice Assistance (VA) applications associated with a plurality of VA servers that provide a conversation service; and a processor configured to based on a user input for performing a function corresponding to at least one VA application being received through the user input receiver, perform a function corresponding to a first VA application among the plurality of VA applications stored in the memory according to setting information designating the function corresponding to the first VA to be automatically performed according to the user input, and based on a wake up word for performing a function corresponding to a second VA application among the plurality of VA applications being included in the user voice input received through the voice receiver, change the setting information stored in the memory such that the function corresponding to the second VA application is automatically performed according to the user input.

13 Claims, 9 Drawing Sheets

(51) Int. Cl.
  *G06F 3/16*     (2006.01)
  *G10L 15/08*    (2006.01)
  *G10L 15/28*    (2013.01)
(52) U.S. Cl.
  CPC ........ *G10L 15/28* (2013.01); *G10L 2015/088* (2013.01); *G10L 2015/223* (2013.01)

(56) References Cited

U.S. PATENT DOCUMENTS

| | | | | |
|---|---|---|---|---|
| 2019/0214002 | A1* | 7/2019 | Park | G10L 15/30 |
| 2021/0104242 | A1* | 4/2021 | Hashimoto | G10L 15/08 |
| 2021/0233556 | A1* | 7/2021 | Kashima | G10L 15/02 |

FOREIGN PATENT DOCUMENTS

| | | |
|---|---|---|
| KR | 10-2014-0102339 | 8/2014 |
| KR | 10-2018-0084392 A | 7/2018 |
| KR | 10-2018-0110971 A | 10/2018 |
| KR | 10-2018-0130648 A | 12/2018 |
| KR | 10-2019-0068133 A | 6/2019 |
| KR | 10-2019-0079791 A | 7/2019 |
| KR | 10-2019-0105175 A | 9/2019 |
| WO | WO 2019/198132 A1 | 10/2019 |

OTHER PUBLICATIONS

International Written Opinion issued in International Patent Application No. PCT/KR2020/018679 dated Apr. 9, 2021.
Extended European Search dated Nov. 22, 2022 in European Patent Application No. 20914836.0 (13 pages).
Communication under Rule 71(3) EPC dated Feb. 7, 2024 for corresponding European patent application 20 914 836.0-1224.
Office Action issued by the Korean Patent Office on Nov. 25, 2024 for the Korean Patent Application No. 10-2020-0007759.

* cited by examiner

DISPLAY DEVICE AND METHOD FOR CONTROLLING SAME

CROSS-REFERENCE TO RELATED APPLICATION(S)

This application is a continuation application, under 35 U.S.C. § 111(a), of International Patent Application No. PCT/KR2020/018679, filed on Dec. 18, 2020, which claims the benefit of Korean Patent Application No. 10-2020-0007759, filed on Jan. 21, 2020, in the Korean Intellectual Property Office, the entire disclosures of which are herein incorporated by reference as a part of this application.

BACKGROUND

Field

The disclosed embodiments relate to a display device for providing an artificial intelligence conversation service, and a method for controlling the display device.

Description of Related Art

An artificial intelligence system is used in various fields. The artificial intelligence system is a system in which a machine performs learning and updating by itself, unlike existing rule-based smart systems. As the artificial intelligence system is used more and more, a recognition rate is improved. For this reason, the existing rule-based smart systems have been gradually replaced by deep learning-based artificial intelligence systems.

Such an artificial intelligence system is used in various fields. For example, the artificial intelligence system is used for linguistic understanding, visual understanding, inference/prediction, and a motion control. More specifically, the linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of deciding and logically inferring and predicting information, and includes knowledge/probability-based inference, optimization prediction, preference-based planning, recommendation, and the like. The knowledge representation is a technology of automating and processing human experience information as knowledge data, and includes knowledge construction (data creation/classification), knowledge management (data utilization), and the like. The motion control is a technology of controlling autonomous driving of a vehicle and a motion of a robot, and includes a motion control (navigation, collision, driving), a manipulation control (behavior control), and the like.

More specifically, an artificial intelligence system which is applied to linguistic understanding is applied in many products, such as a speaker, a smart phone, a tablet, a wearable device, a TV, a sound bar, and the like. Also, many artificial intelligence conversation services, such as Samsung's Bixby, Amazon's Alexa, Google's Google Assistance, and the like, are used around the world.

Recently, a product capable of using such various artificial intelligence conversation services at the same time is being developed.

SUMMARY

A display device according to an embodiment of the disclosure includes: a user input receiver configured to receive an input from a user (a user input); a voice receiver configured to receive an utterance voice from the user (a user voice input); a memory configured to store a plurality of Voice Assistance (VA) applications associated with a plurality of VA servers that provide a conversation service; and a processor configured to based on a user input for performing a function corresponding to at least one VA application being received through the user input receiver, perform a function corresponding to a first VA application among the plurality of VA applications stored in the memory according to setting information designating the function corresponding to the first VA to be automatically performed according to the user input, and based on a wake up word for performing a function corresponding to a second VA application among the plurality of VA applications being included in the user voice input received through the voice receiver, change the setting information stored in the memory such that the function corresponding to the second VA application is automatically performed according to the user input.

The processor may be configured to compare the first VA application with the second VA application, and identify whether to change the setting information based on a result of the comparison.

The processor may be configured to perform preprocessing on the user voice input, received from the voice receiver, and transfer the preprocessed user voice input from the user to the second VA application.

The plurality of VA applications may be configured to store conversion policies in the memory, provide voice messages based on utterance voices from the user and the conversion policies, and update the conversation policies through the plurality of VA servers associated with the plurality of VA applications.

The display device may further include a sound outputter configured to output the voice messages, wherein the processor may be configured to control the sound outputter based on a voice message provided by the second VA application.

The display device may further include an image outputter configured to display a user interface, wherein the processor may be configured to display a user interface related to activation/deactivation of the setting information through the image outputter.

The processor may be configured to perform preprocessing on the user voice input, received through the voice receiver, and recognize a wake up word for executing the second VA application from the preprocessed user voice input based on a preset time period.

The processor may be configured to perform preprocessing on the user voice input, received through the voice receiver, and identify whether a wake up word for performing the function corresponding to the second VA application is included in the preprocessed user voice input.

The processor may be configured to identify whether to change the setting information based on a repetition number of a wake up word for performing the function corresponding to the second VA application.

The processor may be configured to perform preprocessing on the user voice input based on at least one of noise removal, echo canceling, or beamforming.

A display device according to another embodiment of the disclosure includes: a communicator configured to communicate with a remote controller; a voice receiver configured to receive an utterance voice from a user; a memory configured to store a plurality of Voice Assistance (VA) applications associated with a plurality of VA servers that provide a conversation service based on the utterance voice from the user; and a processor configured to based on a user input for performing a function corresponding to at least one VA application being received through the user input receiver, perform a function corresponding to a first VA application among the plurality of VA applications stored in the memory according to setting information designating the function corresponding to the first VA to be automatically performed according to the user input, and based on a wake up word for performing a function corresponding to a second VA application among the plurality of VA applications being included in the user voice input received through the voice receiver, change the setting information stored in the memory such that the function corresponding to the second VA application is automatically performed according to the user input.

A method for controlling a display device according to another embodiment of the disclosure, includes: receiving a user input for performing a function corresponding to at least one Voice Assistance (VA) application or a user voice input; based on a user input for performing a function corresponding to at least one VA application being received through the user input receiver, performing a function corresponding to a first VA application among the plurality of VA applications stored in the memory according to setting information designating the function corresponding to the first VA to be automatically performed according to the user input; and based on a wake up word for performing a function corresponding to a second VA application among the plurality of VA applications being included in the user voice input received, changing the setting information stored in the memory such that the function corresponding to the second VA application is automatically performed according to the user input.

The changing may include comparing the first VA application with the second VA application, and identifying whether to change the setting information based on a result of the comparison.

The method may further include: performing preprocessing on the user voice input; and transmitting a voice command as a result of the preprocessing to the second VA application.

The method may further include outputting a voice message provided by the second VA application.

The method may further include displaying a user interface related to activation/deactivation of the setting information.

The method may further include performing preprocessing on the user voice input, wherein the changing may include recognizing a wake up word for performing the function corresponding to the second VA application from the preprocessed user voice input based on a preset time period.

The recognizing may include identifying whether the wake up word for performing the function corresponding to the second VA application is included in the preprocessed user voice input.

The changing may include changing the setting information based on a repetition number of the wake up word for performing the function corresponding to the second VA application.

The performing of the preprocessing may include performing the preprocessing based on at least one of noise removal, echo canceling, or beamforming.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
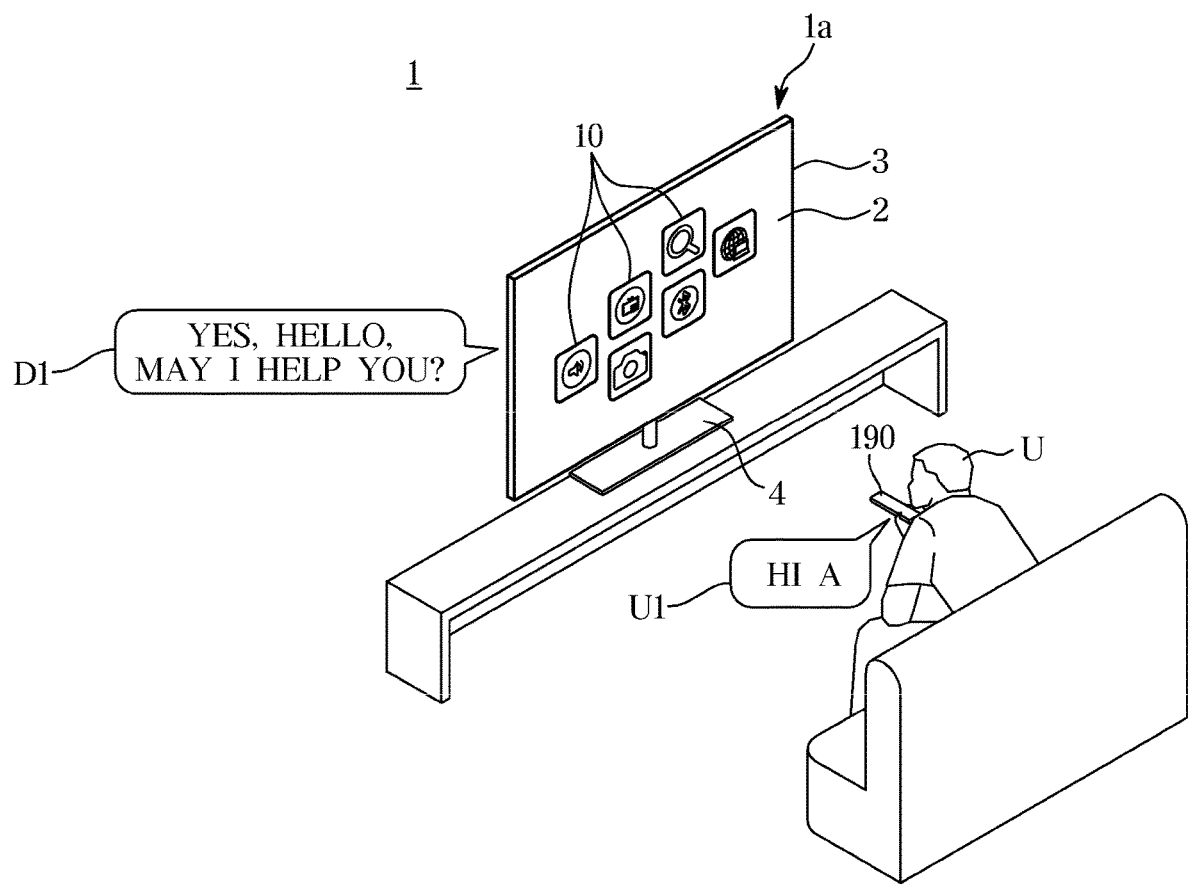
FIG. 1 shows an outer appearance of a TV implemented as a display device.

Throughout this specification, like reference numerals will refer to like components. The present specification does not describe all elements of the embodiments, and descriptions about content being general in the technical art to which the disclosure belongs or overlapping content between the embodiments will be omitted. As used herein, the terms "part", "portion", "module", "member" and "block" may be implemented as software or hardware, and according to embodiments, a plurality of "parts", "portions", "modules", "members" or "blocks" may be implemented as a single component, or a single "part", "portion", "module", "member" or "block" may include a plurality of components.

In the entire specification, it will be understood that when a certain part is referred to as being "connected" to another part, it can be directly or indirectly connected to the other part. When a part is indirectly connected to another part, it may be connected to the other part through a wireless communication network.

Also, it will be understood that when a certain part "includes" a certain component, the part does not exclude another component but can further include another component, unless the context clearly dictates otherwise.

In the entire specification, it will also be understood that when an element is referred to as being "on" or "over" another element, it can be directly on the other element or intervening elements may also be present.

It will be understood that the terms "first", "second", etc., may be used only to distinguish one component from another, and these components should not be limited by these terms.

It is to be understood that the singular forms "a," "an," and "the" include plural referents unless the context clearly dictates otherwise.

Reference numerals used in operations are provided for convenience of description, without describing the order of the operations, and the operations can be executed in a different order from the stated order unless a specific order is definitely specified in the context.

The disclosed display device and the method for controlling the same may reduce a user's inconvenience and easily execute an artificial intelligence conversion service by changing setting information for connecting to the artificial intelligence conversion service with an input button for performing a Push To Talk (PTT) function through the user's wake up word utterance.

An aspect of the disclosure relates to a display device capable of reducing a user's inconvenience and easily executing an artificial intelligence conversion service by changing setting information for connecting to the artificial intelligence conversation service with an input button for performing a Push To Talk (PTT) function through the user's wake up word utterance, and a method for controlling the display device.

Hereinafter, an operation principle and embodiments of the disclosure will be described with reference to the accompanying drawings.

FIG. 1 shows an outer appearance of a TV implemented as a display device.

Referring to FIG. 1, a display device 1 may be implemented as a Television (TV) 1a. The TV 1a may include a display panel 2, a housing 3 supporting the display panel 1, and a support 4.

The housing 3 may form an outer appearance of the TV 1a, and install components for enabling the TV 1a to display various images or perform various functions therein. The housing 3 and the display panel 2 may be integrated into one body, or the housing 3 may be configured as a combination of a front housing and a rear housing.

The support 4 may support the housing 3. The support 4 may have various shapes according to a designer's selection, or may be omitted as necessary. The support 4 may be attached to or detached from the housing 3 as necessary.

The display panel 2 may be installed on a front side of the housing 3 and display various images to outside. More specifically, the display panel 2 may display at least one still image or moving image. The display panel 2 may be implemented by further using a separate component, such as a touch panel and the like, as necessary.

In the display panel 2, a plurality of pixels may be formed, and an image displayed through the display panel 2 may be formed by a combination of light emitted from the plurality of pixels. For example, light emitted from the plurality of pixels may be combined like mosaic, thereby forming an image on a screen 102.

An image displayed by the display panel 2 may include various user interfaces 10. The user interfaces 10 may include icons and shapes that may represent various functions of the display device 1.

Meanwhile, the display device 1 may execute various conversation services, such as Bixby, Alexa, Google Assistance, and the like. For this, the display device 1 may store Voice Assistance (VA) applications for executing the individual conversation services in a memory, and communicate with VA servers that execute the conversation services.

As shown in FIG. 1, a user U may input an utterance voice (U1: Hi A) for executing at least one VA application among a plurality of VA applications to the TV 1a. The TV 1a may perform preprocessing on the utterance voice from the user U, and transmit a converted electrical signal to the plurality of VA applications. When a first VA application among the plurality of VA applications has set A to a wake up word, the first VA application may operate. The TV 1a may output a voice message (D1: Yes, Hello, May I help you?) generated by the first VA application through a speaker. The user U may additionally input an utterance voice for operating the TV 1a, and the TV 1a may perform an operation desired by the user U based on a conversation policy and a control signal processed by the first VA application. Through the example, the TV 1A may provide the user U with a conversation service.

The TV 1a may display various setting information required for executing the conversation service with the user U, as a user interface. When the user U executes a Push To Talk (PTT) function through a button provided in a remote controller 190 (see FIG. 3), the TV 1a may execute a preset VA application.

A typical display device executes, when a user U executes the PTT function, only a VA application for performing a preset conversation service. Also, the typical display device executes, in order to change the preset VA application, a user interface for enabling the user U to change setting information and allows a change of the setting information according to manual operation.

The display device 1 may solve the above-described problem by changing setting information designating a VA application among the plurality of VA applications by recognizing an utterance voice from a user U. A method for changing setting information in the display device 1 will be described in detail with reference to the following drawings, below.

Figure 2:
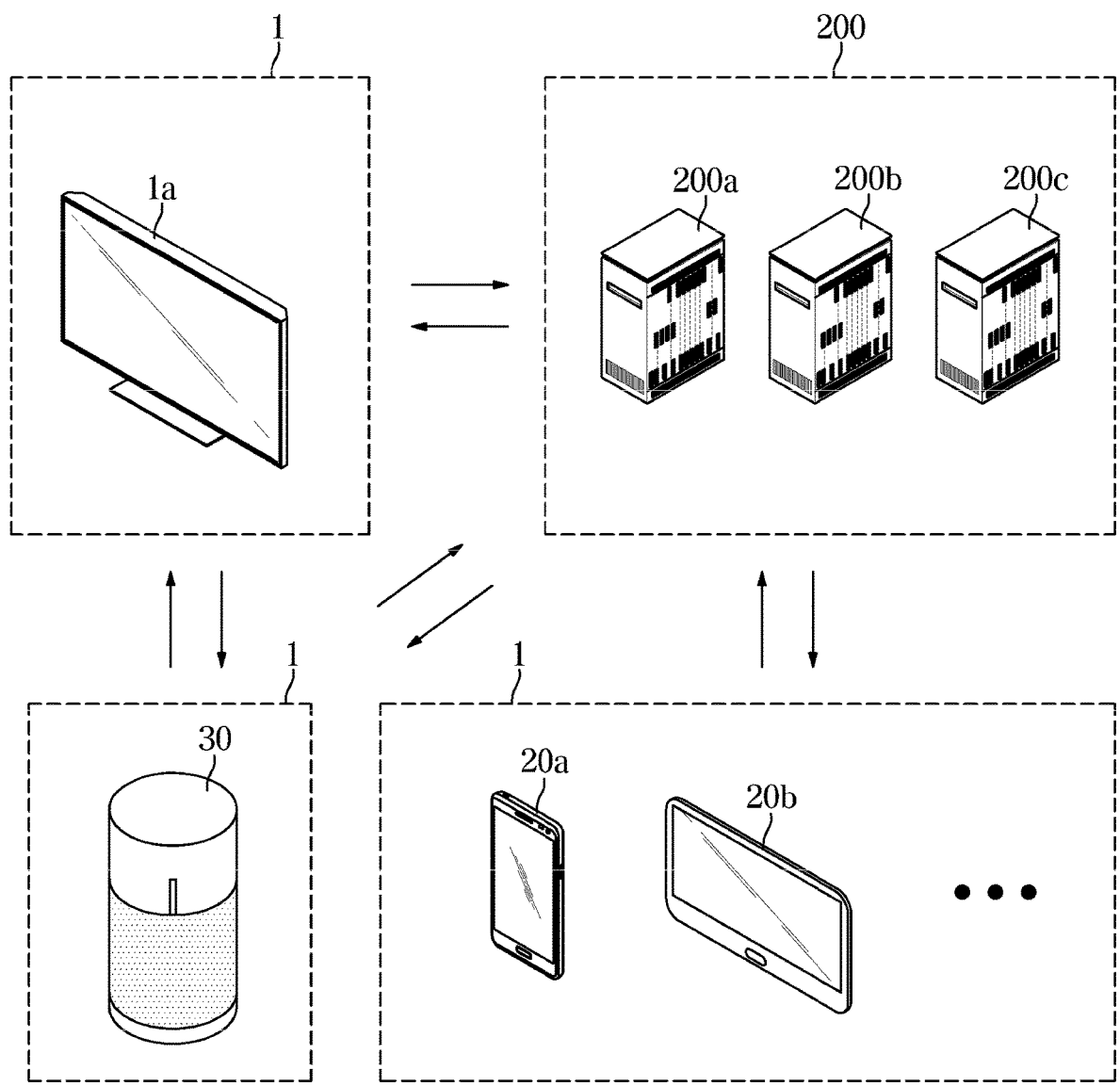
FIG. 2 is a view for describing display devices according to various embodiments and a method for executing a conversation service.

FIG. 2 is a view for describing display devices according to various embodiments and a method for executing a conversation service.

The display device 1 may also be applied to various products 20a, 20b and 30 shown in FIG. 2, as well as the TV 1a described as the embodiment of FIG. 1. More specifically, the display device 1 may be applied to a user terminal, such as a smart phone 20a and a tablet PC 20b, and an artificial intelligence speaker such as a sound bar 30.

The user terminal 20a and 20b may be implemented as a portable terminal capable of accessing a client server 200 that performs a conversation service through a network. More specifically, the user terminal 20a and 20b may include all kinds of handheld-based wireless communication devices, such as Personal Communication System (PCS), Global System for Mobile communications (GSM), Personal Digital Cellular (PDC), Personal Handyphone System (PHS), Personal Digital Assistant (PDA), an International Mobile Telecommunication-2000 (IMT-2000) terminal, a Code Division Multiple Access-2000 (CDMA-2000) terminal, a W-Code Division Multiple Access (W-CDMA) terminal, a Wireless Broadband Internet (WiBro) terminal, and the like, and wearable devices, such as a watch, a ring, a bracelet, an anklet, a necklace, glasses, contact lenses, a head-mounted-device (HMD), and the like.

The sound bar 30 may be a fixed type, not a portable type, and may function as a console capable of controlling various electronic products through a home network connected thereto. Also, the sound bar 30 may include a display panel and a speaker capable of processing an utterance voice from a user U, and output a voice message in response to the utterance voice from the user U. When a user U inputs an utterance voice including a wake up word, the sound bar 30 may be converted from a standby mode to an active mode. The sound bar 30 may transmit a control command included in an additional utterance voice from the user U to an electronic product connected through a network, and enable the electronic product to process the control command from the user U.

As such, the display device 1 that may be applied to the TV 1a, the user terminal 20, and the sound bar 30 may be connected to external servers 200a, 200b, and 200c through a network. The external servers 200a, 200b, and 200c may be servers for conversation services associated with the plurality of VA applications included in the display device 1.

More specifically, a VA application may execute a conversation service through a conversation policy by using the memory included in the display device 1. The VA application may output a voice message corresponding to an utterance voice from a user U through the conversation policy. However, the VA application may not store all of various conversation policies due to a limit of the memory installed therein. Also, to establish a conversation policy capable of continuing to be learned, the VA application may communicate with the external servers 200a, 200b, and 200c, and continue to update the conversation policy. For example, the VA application may store a simple conversation policy such as an output of a voice message corresponding to a wake up word input in the display device 1, and receive detailed conversation policies corresponding to various utterance voices input by a user U from the servers 200a, 200b, and 200c.

The plurality of VA applications included in the display device 1 may communicate with the respective servers 200a, 200b, and 200c. For example, when the display device 1 includes three VA applications, the display device 1 may be connected to three external servers 200a, 200b, and 200c.

Figure 3:
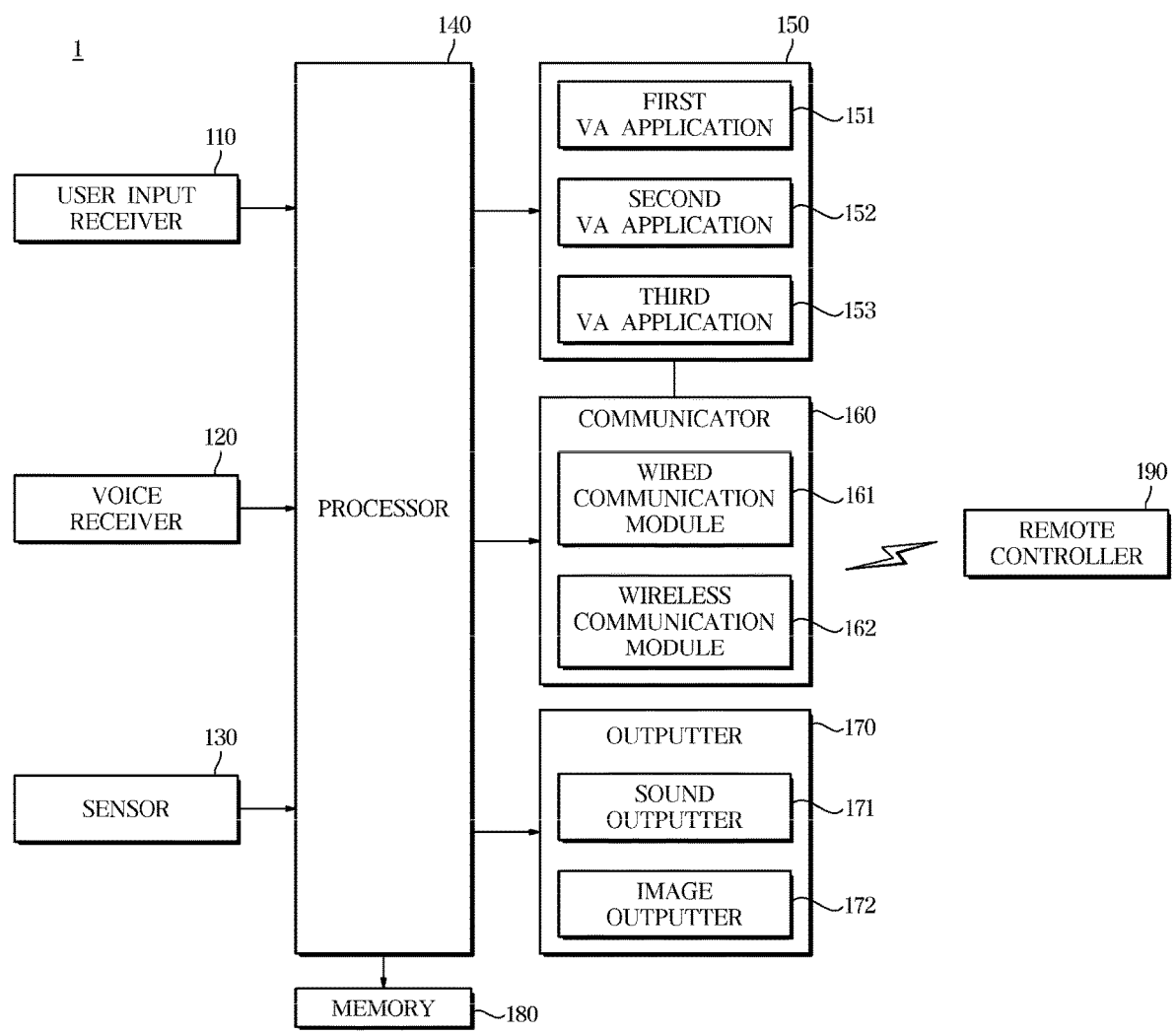
FIG. 3 is a control block diagram of a display device according to an embodiment.

FIG. 3 is a control block diagram of a display device according to an embodiment.

Referring to FIG. 3, the display device 1 may include a user input receiver 110 for receiving an input from a user U which is a user tactical input (a user input), a voice receiver 120 for receiving an utterance voice from the user U (a user voice input), a sensor 130 for sensing a gesture made by the user U, a processor 140 for performing preprocessing on the utterance voice, recognizing a wake up word from the processed utterance voice, and connecting to a VA application 150 corresponding to the recognized wake up word, a plurality of VA applications 150 for executing a conversation service described above with reference to FIGS. 1 and 2, a communicator 160 for transmitting data required or processed by the processor 140 and the VA applications 150 to outside, an outputter 170 for outputting voice messages and images processed by the processor 140 and the VA applications 150, and a memory 180 storing setting information and data required for operations of the processor 140.

More specifically, the user input receiver 110 may include an input button for receiving various commands input by the user U. According to an example, when the display device 1 is provided in the user terminal 20, the input button may be a button provided on an outer side. The input button may be used as a device for receiving a PTT function. When the user U pushes the input button for performing the PTT function, the display device 1 may connect to a preset first VA application 151 among the plurality of VA applications 150.

Also, the user input receiver 110 may include a power button for turning on or off the display device 1, a source selection button for selecting a source device from among a plurality of source devices, a sound control button for adjusting a sound volume to be output from the display device 1, etc. The various buttons may be implemented by various input means, such as a push switch, a touch switch, a dial, a slide switch, a toggle switch, etc.

The voice receiver 120, which is a device for receiving an utterance voice from a user U, may include a microphone for receiving sound, converting the sound into an electrical signal, and outputting the electrical signal. The voice receiver 120 may be configured with a plurality of microphones to effectively receive voices. For example, when the display device 1 is provided in the TV 1a, the plurality of microphones may be positioned at different locations of the housing 3.

The sensor 130 may be a hardware device for collecting various information based on which the display device 1 may operate. For example, when the display device 1 senses a user's gesture, the sensor 130 may include a camera. As another example, when the display device 1 is provided in a wearable device, etc., the display device 1 may include various sensors, such as an ultrasonic sensor, an IR sensor, an acceleration sensor, or a gyro sensor.

The VA application 150 may process an utterance voice from the user U, generate a voice message according to a conversation policy, and understand a control command included in the utterance voice from the user U. The VA application 150 may control the display device 1 to perform an operation according to the control command included in the utterance voice.

More specifically, the VA application 150 may include a speech recognition engine, and the speech recognition engine may apply a speech recognition algorithm to an input utterance voice to recognize a voice uttered by the user U. The VA application 150 may detect a start point and an end point from a voice signal to detect (End Point Detection (EPD)) an actual voice section included in the input voice, and generate a result of recognition in a form of an utterance through filtering. The utterance may be implemented by an acoustic model of modeling and comparing signalistic characteristics of a voice, and a language model of modeling a linguistic ordering relation of a word, a syllable, etc. corresponding to a recognition vocabulary.

The VA application 150 may perform natural language understanding through the utterance as the result of speech recognition. The natural language understanding may perform various analysis, such as morphological analysis, entity name recognition, speech act analysis, etc., on the utterance, and interpret an intention of the uttered voice. After the intention is interpreted, the VA application 150 may identify the intention to a conversation policy and generate a voice message stored in the conversation policy. In the generated voice message, an input word such as an entity name analyzed in the natural language understanding may be used.

The VA application 150 may update the conversion policy through the communicator 160. More specifically, the VA application 150 may transmit a result of processing on the voice uttered by the user U to the server 200. The server 200 may input various collected examples as input values to an artificial intelligence neural network. The server 200 may update the conversation policy through a result output based on the input values. The server 200 may transmit the updated conversation policy to the VA application 150, and the VA application 150 may use the updated conversation policy in a future conversation with the user U.

Meanwhile, the VA application 150 may not necessarily update only a conversation policy through the server 200. The VA application 150 may update an algorithm included in the above-described speech recognition engine through the server 200, and perform a conversation service with the user U through various updates.

The VA application 150 may include a plurality of VA applications 151, 152, and 153, and the VA applications 151, 152, and 153 may include different recognition algorithms, natural understandings, and conversation policies according to manufacturing companies. Also, the individual servers 200a, 200b, and 200c provided by the manufacturing companies may update conversation policies, etc. through different artificial intelligences. That is, the display device 1 may include the plurality of VA applications 151, 152, and 153, and provide various conversation services to the user U.

The processor 140 may be a configuration for performing preprocessing on a user's utterance voice input to the VA application 150.

More specifically, the voice receiver 120 may receive an utterance voice from a user U, and change the utterance voice to an electrical signal. The voice receiver 120 may transmit the electrical signal to the processor 140, and the processor 140 may perform preprocessing, such as noise removal, echo canceling or beamforming, on the electrical signal before transmitting the electrical signal to the VA application 150, such that the speech recognition engine is capable of recognizing the voice.

The noise removal may be a preprocessing process of removing various noises except for an utterance from a user U from among various sounds received from the voice receiver 120. For example, the noise removal may be performed by removing a signal of a preset frequency band.

The echo canceling may be preprocessing of generating an opposite sound wave of a sound wave to be processed as a noise and causing destructive interference. The processor 140 may perform echo canceling by controlling the voice receiver 120.

The beamforming may be a preprocessing process of performing, when the voice receiver 120 includes a plurality of microphones, synchronization such as time delay on a plurality of electrical signals generated by an utterance voice from a user U.

The processor 140 may perform various preprocessing on the voice input, in addition to the above-described preprocessing, and then transfer the utterance voice from the user U to the VA application 150.

Meanwhile, the processor 140 according to the disclosed embodiment may extract a wake up word before transferring the preprocessed utterance voice to the VA application 150. The processor 140 may recognize the extracted wake up word, and execute at least one VA application among the plurality of VA applications based on the recognized wake up word.

More specifically, the processor 140 may operate the first VA application 151 based on a user input corresponding to the PTT function. That is, the processor 140 may execute the first VA application 151 based on setting information for the first VA application 151 designated to be automatically executed by a user input received by the user input receiver 110 from among the plurality of VA applications stored in the memory 180.

Meanwhile, the processor 140 may receive a wake up word for waking a second VA application 152 up in a process of preprocessing the utterance voice from the user U. The processor 140 may change the setting information from the first VA application 151 to the second VA application 152 based on the recognized wake up word. After the setting information changes, an input command for the PTT function may be again input. In this case, the processor 140 may transfer a preprocessed utterance voice to the second VA application 152 according to the input command. Thereby, the display device 1 may reduce inconvenience that a user U himself/herself has to change setting information through a user interface, and increase easiness in execution of an artificial intelligence conversation service.

The processor 140 may be provided as a chip for performing preprocessing on an utterance voice from a user U. The processor 140 may be sufficient as long as the processor 140 connects the VA application 150 to the voice receiver 120. However, the processor 140 may be provided on a main board for controlling the overall operations of the display device 1.

The communicator 160 may include a wired communication module 161 and a wireless communication module 162.

The wired communication module 161 may be a module for enabling the display device 1 to receive image data from a source device through various kinds of image transmission cables. For example, when the display device 1 is provided as the TV 1a, the wired communication module 161 may receive image data from a source device through a component (YPbPr/RGB) cable, a composite video blanking and sync (CVBS) cable, a High Definition Multimedia Interface (HDMI) cable, a Universal Serial Bus (USB) cable, an Ethernet (IEEE 802.3 technical standard) cable, etc.

The wireless communication module 162 may be a module for performing wireless communication with outside by using various wireless communication standards, and include wireless communication modules that supports various wireless communication methods, such as global System for Mobile Communication (GSM), Code Division Multiple Access (CDMA), Wideband Code Division Multiple Access (WCDMA), universal mobile telecommunications system (UMTS), Time Division Multiple Access (TDMA), and Long Term Evolution (LTE), as well as a Wifi module and a Wireless broadband module.

When the display device 1 according to an embodiment is provided as the TV 1a, the display device 1 may perform wireless communication with the remote controller 190. The remote controller 190 may receive an utterance voice around a user U. The remote controller 190 may convert the utterance voice into a wireless signal, and transmit the wireless signal to the wireless communication module 162.

The remote controller 190 may include various input buttons. The display device 1 may provide an input button for performing the PTT function in the remote controller 190. That is, the remote controller 190 may change the user input received by input button to a wireless signal, and transmit the wireless signal to the wireless communication module 162. The display device 1 may change setting information based on the wireless signal received by the communicator 160, and transfer a user's utterance voice to the second VA application 152.

The outputter 170 may include a sound outputter 171 that outputs a voice message and sound data generated by the VA application 150, and an image outputter 172 that outputs image data generated by the VA application 150 according to a conversation policy, a user interface including setting information, and image data in a format of a frame representing an image signal received from a source device or outside.

The sound outputter 171 may include an audio amp (not shown) for amplifying sound, and a speaker (not shown) for acoustically outputting the amplified sound.

The sound outputter 171 may amplify a sound signal output through the audio amp. Also, the speaker may convert the sound signal amplified by the audio amp into sound (sound wave). For example, the speaker may include a thin film vibrating according to an electrical sound signal, and a sound wave may be generated by vibrations of the thin film.

The image outputter 172 may include the display panel 2 for visually displaying images, and a display driver (not shown) for driving the display panel 2.

According to an embodiment, when the display device 1 is implemented as the TV 1*a*, the individual pixels of the display panel 2 may receive electrical signals representing an image from the display driver, and output optical signals corresponding to the received electrical signals. The optical signals output from the plurality of pixels may be combined and accordingly, an image may be displayed on the display panel 2. The display panel 2 may be implemented by various types of panels, such as a Liquid Crystal Display (LCD) Panel, a Light Emitting Diode (LED) Panel, or an Organic Light Emitting Diode (OLED) Panel, etc.

The memory 180 may store programs and data for controlling configurations included in the display device 1, and store setting information.

The setting information may mean transmitting an utterance voice from a user U to the first VA application 151 according to reception of an input command corresponding to the PTT function. The setting information may be decided by a manufacturing company or a detailed selection by the user U, and stored in the memory 180. In the disclosed embodiment, when the display device 1 recognizes a wake up word for the second VA application 152 from an utterance voice from a user U, the stored setting information may change.

Meanwhile, a VA application shown in FIG. 2 may be implemented as software that executes a conversation service. In the case in which VA applications are implemented as software, a plurality of VA applications may be stored as a program in the memory 180. The processor 140 may perform preprocessing on an utterance voice, read a VA application corresponding to a wake up word from the memory 180, then execute the VA application, and thereby implement a conversation service.

The memory 180 may be provided as a non-volatile memory, such as Read Only Memory (ROM) and a flash memory, for storing data for a long time, and a volatile memory, such as a Static Random Access Memory (S-RAM) and Dynamic Random Access Memory (D-RAM), for temporarily storing data. The memory 180 and the processor 140 may be implemented as separate chips or integrated into a single chip.

Meanwhile, the display device 1 may further include various configurations in addition to the above-described configurations, or may omit some of the above-described configurations. According to applied embodiments, the positions or connection relationships of the above-described configurations may change.

Figure 4:
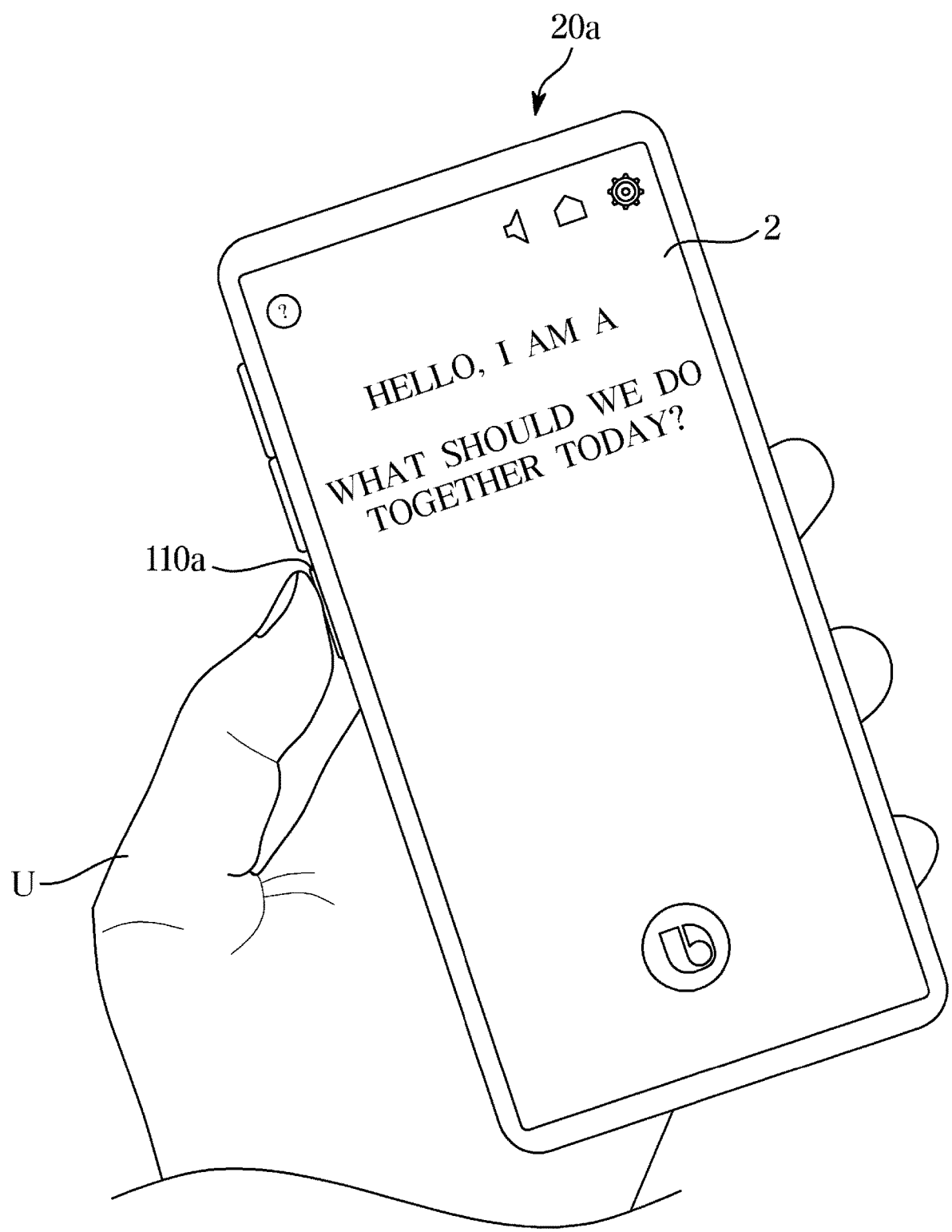
FIGS. 4 to 6 are views for describing operations of a display device implemented as a user terminal, according to another embodiment.
Figure 5:
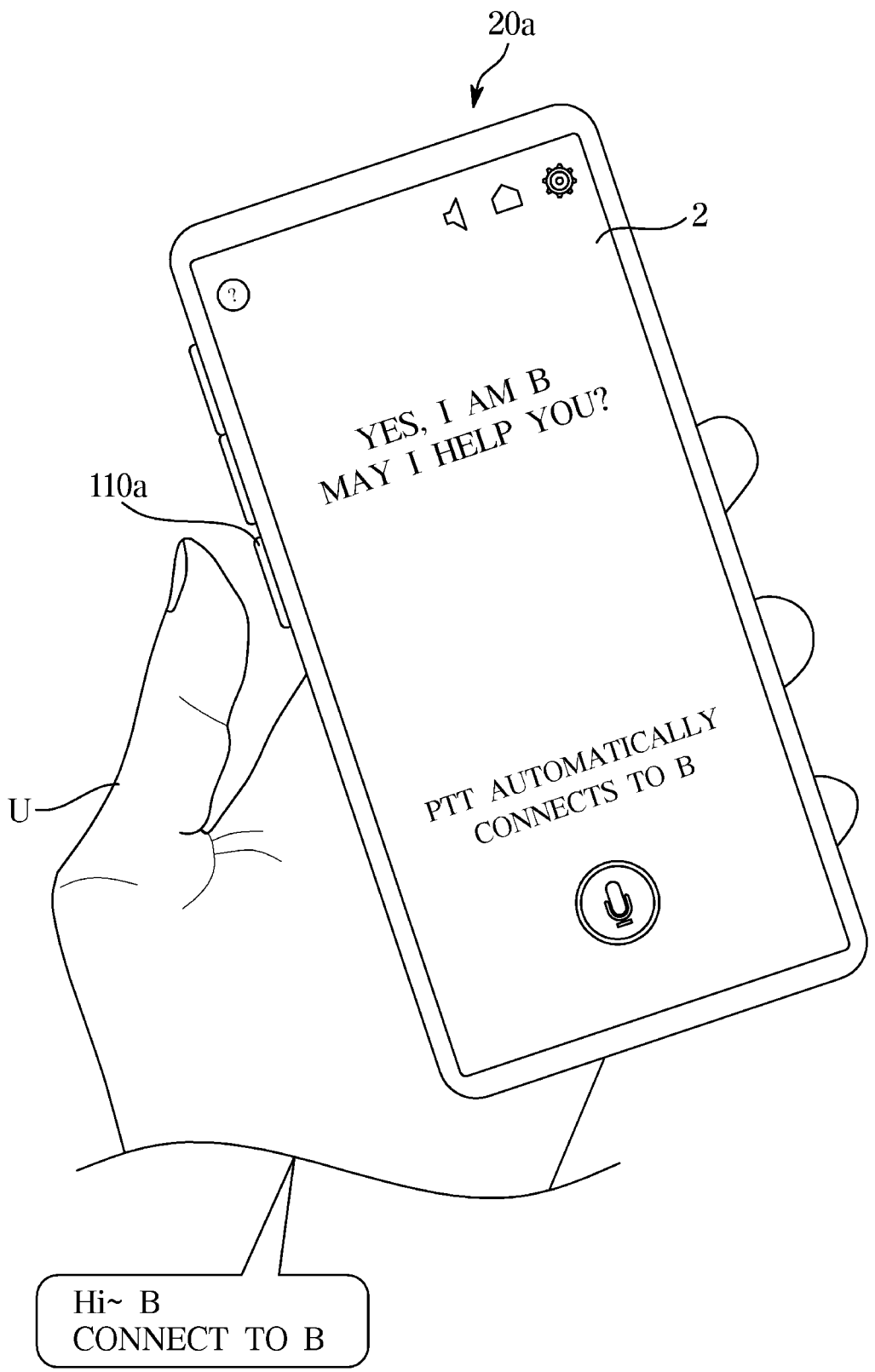
Figure 6:
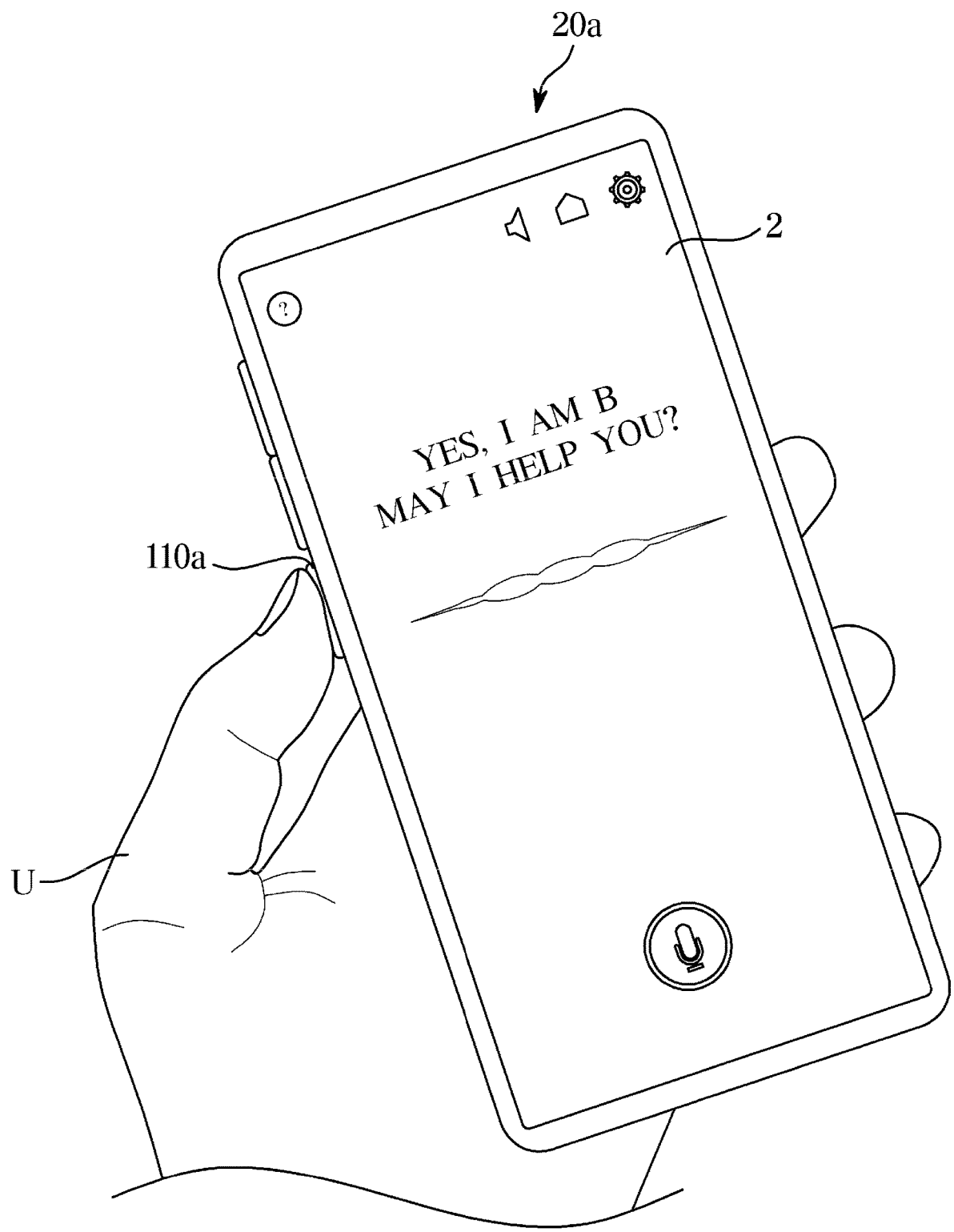

FIGS. 4 to 6 are views for describing operations of a display device implemented as a user terminal, according to another embodiment.

As described above with reference to FIG. 2, the display device 1 may be provided in the smart phone 20*a* among user terminals. In FIGS. 4 to 7, the display device 1 is assumed to be the smart phone 20*a*.

Referring first to FIG. 4, a user U may transmit an input for the PTT function to the smart phone 20*a* through at least one button 110*a* in the user input receiver 110.

The smart phone 20*a* may execute the first VA application 151 according to preset setting information. The first VA application 151 may output a voice message based on a conversation policy corresponding to the input for the PTT function.

More specifically, the smart phone 20*a* may output, as sound, a voice message, that is, "Hello, I am A" and "What should we do together today", including a wake up word A corresponding to the first VA application 151. Also, the smart phone 20*a* may display "Hello, I am A" and "What should we do together today" on the display panel 2.

After the voice message is output, the user U may input an additional utterance voice, and the first VA application 151 may understand an intention of the user U from the additional utterance voice and then perform a function based on the intention.

Referring to FIG. 5, the user U may input an utterance voice without controlling the input button 110*a*. For example, the utterance voice may include "Hi~B" and "Connect to B".

The smart phone 20*a* may perform preprocessing on the utterance voice including "Hi~B" and "Connect to B". Also, the smart phone 20*a* may transmit the preprocessed utterance voice to the plurality of VA applications 150. When "Hi~B" or a wake up word B is a condition for executing operation of the second VA application 152, the second VA application 152 will operate. The second VA application 152 may output a voice message corresponding to the utterance voice from the user U according to a conversation policy. For example, the smart phone 20*a* may output a voice message, that is, "Yes, Hello, May I help you?", generated by the second VA application 152.

Meanwhile, the smart phone 20*a* may recognize the wake up word B in a preprocessing process, regardless of operation of the second VA application 152. The smart phone 20*a* may change setting information such that the second VA application 152 corresponding to the wake up word B is included in a connection application for the PTT function. That is, based on the utterance voice from the user U according to the embodiment of FIG. 5, the smart phone 20*a* may change the first VA application 151 included in the setting information to the second VA application 152.

To notify the user U that the setting information has changed, the smart phone 20*a* may display a guide sentence "PTT automatically connects to B" on the display panel 2 without outputting a voice message.

Referring to FIG. 6, after the setting information changes, the user U may execute the PTT function through the input button 110*a*. The smart phone 20*a* may operate the second VA application 152 based on an input command, and the second VA application 152 may output "Yes, I am B, May I help you?" based on a conversation policy.

Meanwhile, the voice message and guide sentence included in FIGS. 4 to 6 may be an example. That is, the display device 1 may output another voice message and another output sentence, instead of various methods described above.

Figure 7:
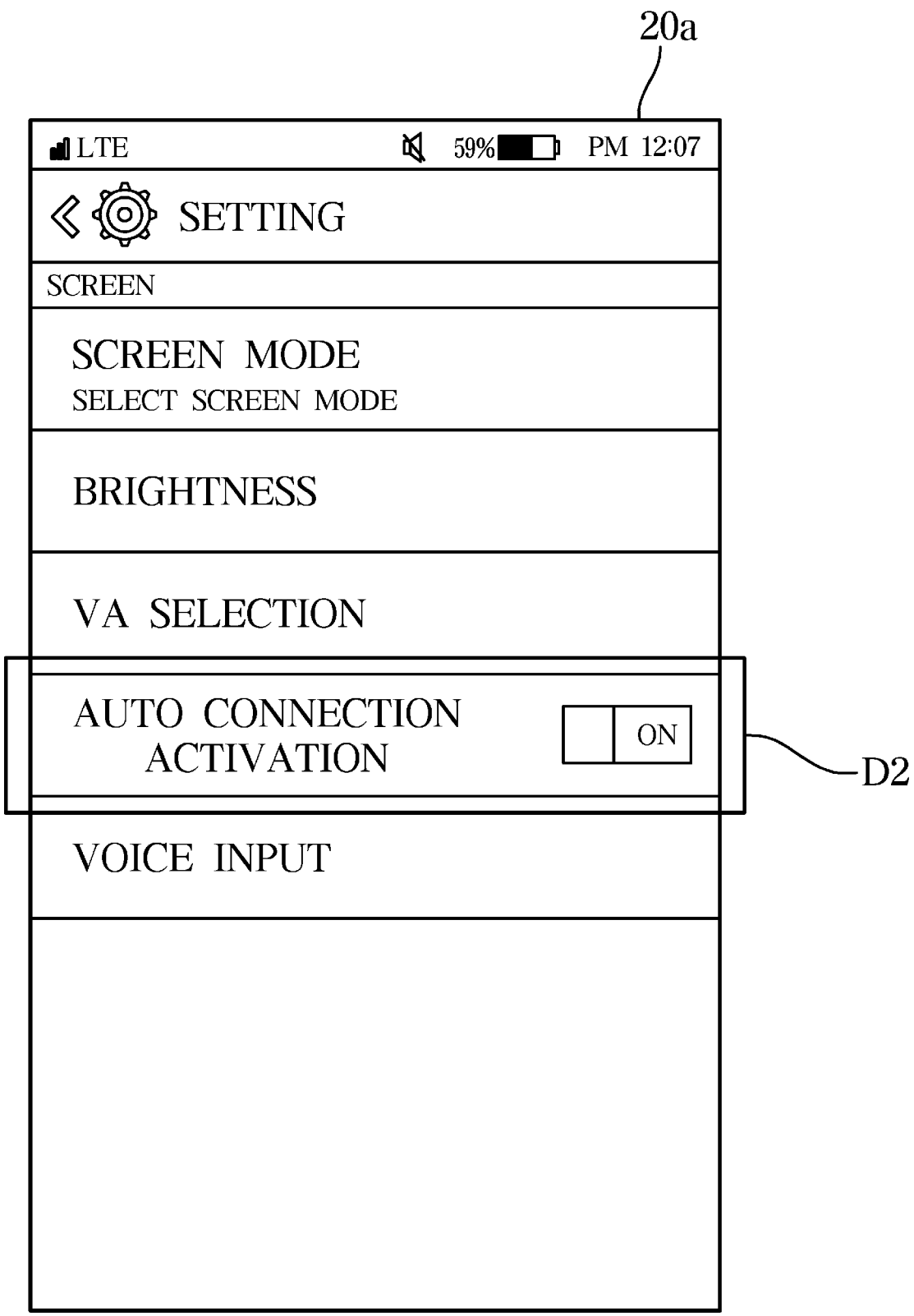
FIG. 7 shows an example of a user interface related to activation/deactivation of setting information.

FIG. 7 shows an example of a user interface related to activation/deactivation of setting information.

The display device 1 may display a user interface for selecting activation/deactivation of a function of automatically changing setting information. When the display device 1 is implemented as the smart phone 20*a*, the smart phone 20*a* may induce a selection by a user U by outputting a text D2 of "Auto Connection Activation", as shown in FIG. 7.

When the user U selects On of Auto Connection Activation, the smart phone 20*a* may automatically change setting information to correspond to a wake up word recognized from an utterance voice from the user U.

When the user U selects Off of Auto Connection Activation, the smart phone 20*a* may not change setting information although a wake up word for the second VA application 152 is included in an utterance voice from the user U. In this case, when an input command for the PTT function is again input, the smart phone 20a may execute the first VA application 151.

Meanwhile, the embodiment shown in FIG. 7 is for convenience of description, and various user interfaces may be possible. For example, the text D2 of "Auto Connection Activation" may also change.

Figure 8:
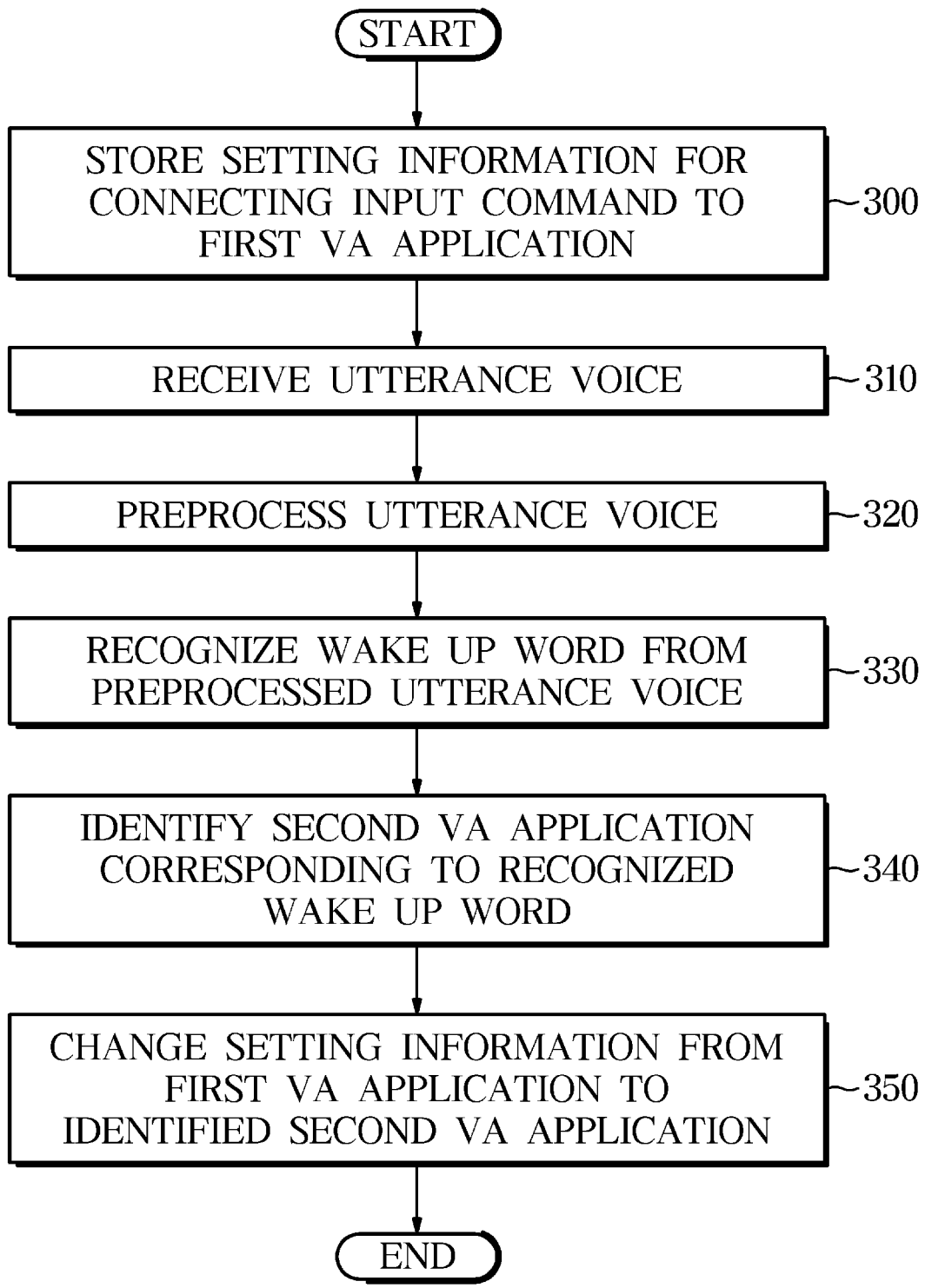
FIG. 8 is a flowchart showing a method for controlling a display device according to an embodiment.

FIG. 8 is a flowchart showing a method for controlling a display device according to an embodiment.

Referring to FIG. 8, the display device 1 may store setting information for connecting an input by a user U to the first VA application 151 among the plurality of VA applications 150 (300).

The setting information may be stored in the memory 180, and change according to an input by a user U.

The display device 1 may receive an utterance voice (310).

The display device 1 may receive the utterance voice through the sound receiver 120 such as a microphone. The voice receiver 120 may change the utterance voice into an electrical signal, and transfer the electrical signal to the processor 140.

The display device 1 may perform preprocessing on the utterance voice (320).

More specifically, the processor 140 may perform preprocessing on the utterance voice based on at least one of noise removal, echo canceling, or beamforming.

The display device 1 may recognize a wake up word from the preprocessed utterance voice (330).

That is, the processor 140 may recognize the wake up word from the preprocessed utterance voice before transferring the preprocessed utterance voice to the plurality of VA applications 150.

The display device 1 may identify the second VA application 152 corresponding to the recognized wake up word (340).

For example, when a wake up word B for the second VA application 152 is recognized from an utterance by the user U, the display device 1 may identify the second VA application 152 corresponding to the wake up word B.

The display device 1 may change the first VA application 151 included in the setting information to the second VA application 152 (350).

More specifically, the display device 1 may compare the second VA application 152 corresponding to the wake up word with the first VA application 151 included in the setting information. When the wake up word is recognized as 'A', the display device 1 may identify the first VA application 151. Because the first VA application 151 included in the setting information is identical to the identified first VA application 151, the display device 1 may not change the setting information. As another example, when a third VA application 153 is recognized, the display device 1 may change the stored setting information from the first VA application 151 to the third VA application 153.

Figure 9:
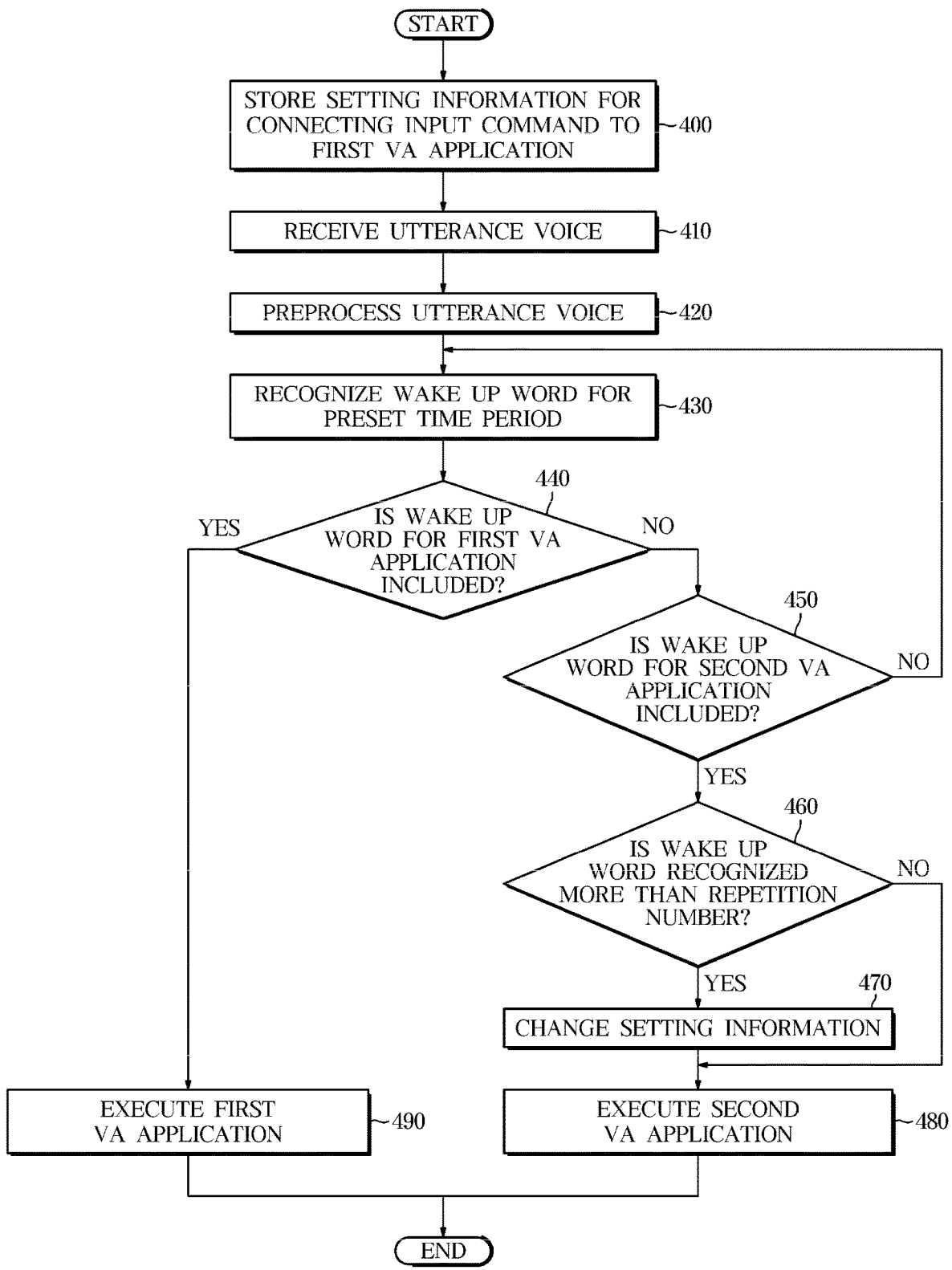
FIG. 9 is a flowchart for describing various methods for changing setting information in a display device.

FIG. 9 is a flowchart for describing various methods for changing setting information in a display device.

Referring to FIG. 9, the display device 1 may store setting information for connecting an input command to the first VA application 151 among the plurality of VA applications 150 (400).

The display device 1 may receive an utterance voice (410), and perform preprocessing on the utterance voice (420). Then, the display device 1 may recognize a wake up word for a preset time period (430).

The display device 1 may determine whether an utterance voice is input for the preset time period. For example, a user U may input an utterance voice including no wake up word. To accurately recognize whether a wake up word is included, the display device 1 may wait an input of another utterance voice for the preset time period.

After the preset time period elapses, the display device 1 may recognize a wake up word from an utterance voice input for the preset time period. When a wake up word for the first VA application 151 is included in the recognized utterance voice (YES in 440), the display device 1 may execute a conversation service of the first VA application 151.

That is, because a wake up word for the first VA application 151 included in the setting information is identical to the wake up word recognized from the utterance voice, the display device 1 may operate the first VA application 151 without changing the setting information.

When the wake up word for the first VA application 151 is not included in the recognized utterance voice (NO in 440), the display device 1 may determine whether the recognized wake up word is identical to a wake up word for the second VA application 152.

When the recognized wake up word does not include the wake up word for the second VA application 152 (NO in 450), the display device 1 may wait to recognize an utterance voice (430).

When the recognized wake up word includes the wake up word for the second VA application 152 (YES in 450), the display device 1 may determine the number of the wake up words included in the preprocessed utterance voice (460).

To prevent the setting information from changing by a one-time wrong input of the wake up word, the display device 1 may change the setting information when a preset number of the wake up words or more is input.

When the preset number of the wake up words or more is recognized (YES in 460), the display device 1 may change the setting information to the second VA application 152 corresponding to the recognized wake up word (470), and execute a conversation service of the second VA application 152 to enable the second VA application 152 to process an utterance by the user U (480).

When the preset number of the wake up word or more is not recognized (NO in 460), the display device 1 may execute the conversation service of the second VA application 152 without changing the setting information (470) to enable the second VA application 152 to process an utterance by the user U (480).

Thereby, the display device may reduce inconvenience of a user U and easily execute a conversion service by changing setting information for connecting to the conversation service with an input button for performing a PTT function through a voice of a wake up word recognized in advance.

Meanwhile, the methods according to various embodiments of the disclosure may be included in a machine-readable storage medium and provided.

The machine-readable storage medium may be provided in the form of a non-transitory storage medium, wherein the term 'non-transitory storage medium' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

According to an embodiment, the methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

What is claimed is:

1. A display device comprising:
   a user input receiver configured to receive a user input corresponding to a Push to Talk (PTT) function from a user;
   a voice receiver configured to receive an utterance voice from the user;
   a memory storing a plurality of Voice Assistance (VA) applications associated with a plurality of VA servers that provide a conversation service based on the utterance voice from the user; and
   a processor configured to:
      based on the user input corresponding to the PTT function for performing a function corresponding to at least one VA application being received through the user input receiver, perform a function corresponding to a first VA application among the plurality of VA applications according to setting information of the function corresponding to the first VA application to be automatically performed by the user input corresponding to the PTT function, and
      based on the utterance voice including a wake up word for performing a function corresponding to a second VA application among the plurality of VA applications being received through the voice receiver, change the setting information stored in the memory such that the function corresponding to the second VA application is automatically performed by the user input corresponding to the PTT function,
   wherein the processor is further configured to:
      based on the user input corresponding to the PTT function for performing the function corresponding to the at least one VA application through the user input receiver being received after changing the setting information, perform the function corresponding to the second VA application among the plurality of VA applications according to the changed setting information of the second VA application to be automatically performed by the user input corresponding to the PTT function,
   wherein the first VA application is associated with a first VA server among the plurality of VA servers, and the second VA application is associated with a second VA server different from the first VA server among the plurality of VA servers.

2. The display device of claim 1, wherein the processor is configured to perform preprocessing on the utterance voice from the user, received from the voice receiver, and transfer the preprocessed utterance voice from the user to the second VA application.

3. The display device of claim 1, wherein the plurality of VA applications are configured to store conversation policies in the memory that define processing of the utterance obtained from the user through the voice receiver, and the processor is configured to provide voice messages based on the utterance voice from the user and the conversation policies, and update the conversation policies through the plurality of VA servers associated with the plurality of VA applications.

4. The display device of claim 3, further comprising a sound outputter configured to output the voice messages, wherein the processor is configured to control the sound outputter based on a voice message provided by the second VA application.

5. The display device of claim 1, further comprising an image outputter configured to display a user interface, wherein the processor is configured to display a user interface related to activation/deactivation of the setting information through the image outputter.

6. The display device of claim 1, wherein the processor is configured to perform preprocessing on the utterance voice from the user, received through the voice receiver, and recognize the wake up word for performing the function corresponding to the second VA application from the preprocessed utterance voice from the user based on a preset time period.

7. The display device of claim 1, wherein the processor is configured to perform preprocessing on the utterance voice from the user, received through the voice receiver, and determine whether the wake up word for performing the function corresponding to the second VA application is included in the preprocessed utterance voice from the user.

8. The display device of claim 1, wherein the processor is configured to determine to change the setting information based on a repetition number of the wake up word for performing the function corresponding to the second VA application.

9. The display device of claim 1, wherein the processor is configured to perform preprocessing on the utterance voice from the user based on at least one of noise removal, echo canceling, or beamforming.

10. A method for controlling a display device including a memory storing a plurality of Voice Assistance (VA) applications associated with a plurality of VA servers that provide a conversation service based on an utterance voice from a user, comprising:
   receiving a user input corresponding to a Push to Talk, PTT, function for performing a function corresponding to at least one VA application among the plurality of VA applications through a user input receiver;
   based on the user input corresponding to the PTT function for performing a function corresponding to at least one VA application being received through the user input receiver, performing a function corresponding to a first VA application among the plurality of VA applications according to setting information of the function corresponding to the first VA application to be automatically performed by the user input corresponding to the PTT function;
   based on the utterance voice including a wake up word for performing a function corresponding to a second VA application among the plurality of VA applications being received through the voice receiver, changing the setting information such that the function corresponding to the second VA application is automatically performed by the user input corresponding to the PTT function; and
   based on the user input corresponding to the PTT function for performing the function corresponding to the at least one VA application through the user input receiver being received after changing the setting information, performing the function corresponding to the second VA application among the plurality of VA applications according to the changed setting information of the second VA application to be automatically performed by the user input corresponding to the PTT function;

wherein the first VA application is associated with a first VA server among the plurality of VA servers, and the second VA application is associated with a second VA server different from the first VA server among the plurality of VA servers.

11. The method of claim 10, further comprising performing preprocessing on the utterance voice from the user, wherein the changing comprises recognizing the wake up word for performing the function corresponding to the second VA application from the preprocessed utterance voice from the user based on a preset time period.

12. The method of claim 11, wherein the recognizing comprises determining whether the wake up word for performing the function corresponding to the second VA application is included in the preprocessed utterance voice from the user.

13. The method of claim 11, wherein the changing comprises changing the setting information based on a repetition number of the wake up word for performing the function corresponding to the second VA application.

* * * * *